(12) United States Patent
Cui et al.

(10) Patent No.: US 8,478,057 B1
(45) Date of Patent: Jul. 2, 2013

(54) IMAGE COMPRESSION AND DECOMPRESSION USING BLOCK PREDICTION

(75) Inventors: Jingyu Cui, Stanford, CA (US); Vivek Kwatra, Santa Clara, CA (US); Michele Covell, Palo Alto, CA (US); Mei Han, Cupertino, CA (US); Saurabh Mathur, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 833 days.

(21) Appl. No.: 12/692,574

(22) Filed: Jan. 22, 2010

(51) Int. Cl.
*G06K 9/36* (2006.01)

(52) U.S. Cl.
USPC .......................................... 382/232

(58) Field of Classification Search
USPC .. 382/100, 162, 166, 232–253; 345/555–557; 348/384.1–440.1; 358/426.01–426.16; 375/122, 375/240.01–240.29; 708/203–206
See application file for complete search history.

(56) References Cited

PUBLICATIONS

Barnsley, M., et al., "Fractal Image Compression," Notices of the AMS, Jun. 1996, pp. 657-662, vol. 43, No. 6.
Boliek, M., et al., "Jpeg 2000 next generation image compression system features and syntax," Proc. International Conference on Image Processing, Sep. 10-13, 2000, vol. 2, pp. 45-48.
Hoang, D., et al., "Efficient Cost Measures for Motion Estimation at Low Bit Rates," IEEE Transactions on Circuits and Systems for Video Technology, Aug. 1998, pp. 488-500, vol. 8, No. 4.
Wang, H., et al., "Factoring repeated content within and among images," in SIGGRAPH '08: ACM SIGGRAPH 2008 papers, New York, NY, USA, 2008, pp. 1-10, ACM.
Wei, L., et al., "State of the Art in Example-based Texture Synthesis," Eurographics, 2009, 25 pages.
Wiegand, T., et al., "Overview of the H.264/AVC Video Coding Standard," IEEE Transactions on Circuits and Systems for Video Technology, Jul. 2003, pp. 560-576, vol. 13, No. 7.
Zhao, X., et al., "Lossless image compression using super-spatial prediction of structural components," in Proc. Picture Coding Symposium PCS 2009, 2009, pp. 1-4.
Zheng, Y., et al., "Intro Prediction Using Template Matching With Adaptive Illumination Compensation," ICIP, 2008, pp. 125-128.

*Primary Examiner* — Atiba O Fitzpatrick
(74) *Attorney, Agent, or Firm* — Fenwick & West LLP

(57) ABSTRACT

Compression of an image is performed based on prediction of target blocks of an image from candidate source blocks of the image. Heuristics are used for identifying the candidate source blocks, for example, source blocks are selected from within a cluster of similar blocks obtained by K-means clustering. For each target block, a region adjacent to the target block is identified and a set of candidate source blocks along with candidate source regions adjacent to the candidate source blocks are identified. The candidate source regions are ranked based on the differences between the candidate source regions and the target source region. Each candidate source block is described using its rank and residual information describing differences between the candidate source block and the target block. The candidate source block that can be described using a minimum amount of information is selected for predicting the target block.

20 Claims, 9 Drawing Sheets

IMAGE COMPRESSION AND DECOMPRESSION USING BLOCK PREDICTION

FIELD OF THE INVENTION

This invention relates to computer-implemented compression and decompression of digital content, including image and video content.

BACKGROUND

Compression, sometimes called "encoding," is used to represent visual information using a minimum amount of bits. Images have statistical properties that can be exploited during compression, thereby making image compression techniques better than general purpose binary data compression techniques. Videos, being sequences of images, also have the same exploitable properties.

Lossy compression techniques are commonly used to compress images. Such lossy techniques sacrifice finer details of the image in order to obtain a greater rate of compression. When a lossy-compressed image is decompressed, or decoded, the resulting image lacks the fine details that were sacrificed. However, oftentimes the lost details are unnoticeable to human viewers.

Several compression standards have been developed by industry groups such as the Moving Pictures Experts Group (MPEG) in order to encode various types of content. For example, the MPEG-1 standard is used for compact disk read-only memory (CD-ROM) video applications including video CDs, the MPEG-2 standard is used for digital video disks (DVD) and standard definition (SD) high-definition (HD) televisions, and the MPEG-4 standard, including H.264/MPEG4-AVC, is used for multimedia and web applications. Similarly, standards developed by the Joint Photographic Experts Group (JPEG) are used for lossy compression of still images. These standards work well but can be improved.

SUMMARY

The above and other issues are addressed by a computer-implemented method, computer system, and computer program product for compressing a digital image and for decoding a compressed image. Embodiments of the method for compressing a digital image comprise identifying a target block to be encoded. The method further comprises identifying a set of candidate source blocks for predicting the target block. The candidate source blocks are ranked in an order. A reference block is selected from the candidate source blocks based on the size of residual information indicating how well the reference block predicts the target block and a size of information used to specify the position of the reference block in the ranked order of candidate source blocks. The target block is encoded using the reference block. The compressed image having the encoded block is stored.

Embodiments of the computer system for compressing a digital image comprise a computer processor and a computer-readable storage medium storing computer program modules. The computer program modules comprise a target block selector module, a reference block selector module, and a block encoder module. The target block selector module is configured to identify a target block to be encoded. The reference block selector module is configured to identify candidate source blocks for predicting the target block and rank the candidate source blocks. The reference block selector module is further configured to select a reference block from among the candidate source blocks. The reference block is identified by a position in the ranked order. The reference block is selected based on size of residual information indicating how well the reference block predicts the target block and a size of information used to specify the position. The block encoder module is configured to encode the target block using the reference block and store the compressed image having the encoded block.

Embodiments of the computer program product for compressing a digital image have a computer-readable storage medium storing computer-executable code for compressing a digital image. The computer-executable code comprises a target block selector module, a reference block selector module, and a block encoder module. The target block selector module is configured to identify a target block to be encoded. The reference block selector module is configured to identify candidate source blocks for predicting the target block and rank the candidate source blocks. The reference block selector module is further configured to select a reference block from among the candidate source blocks. The reference block is identified by a position in the ranked order. The reference block is selected based on size of residual information indicating how well the reference block predicts the target block and a size of information used to specify the position. The block encoder module is configured to encode the target block using the reference block and store the compressed image having the encoded block.

Embodiments of the method for decoding a compressed digital image comprise identifying a target block to be decoded. The method further comprises identifying a set of candidate source blocks for predicting the target block and ranks the candidate source blocks in an order. A position of a candidate source block in the ranked order is retrieved. The position corresponds to the reference block that was selected during compression of the digital image based on a size of residual information indicating how well the reference block predicts the target block and size of information used to specify the position. The method further comprises decoding the target block using the reference block and storing an uncompressed image having the decoded target block.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a computing environment illustrating the steps of encoding/decoding an image according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

System Environment

Figure 1:
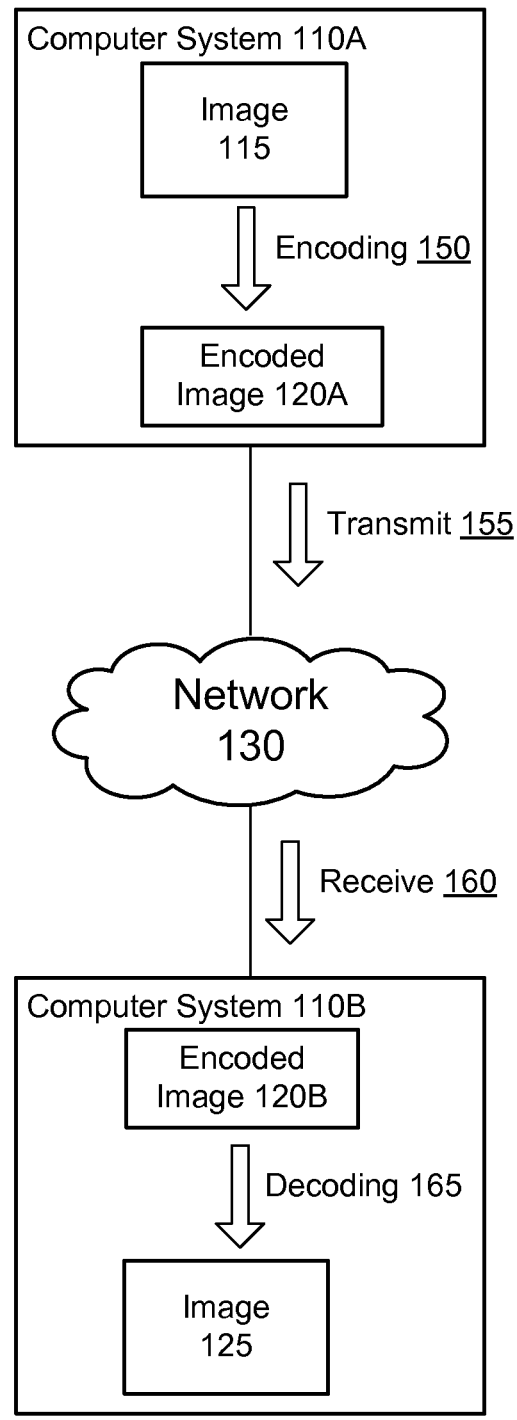

FIG. 1 is a high-level block diagram that illustrates a computing environment 100 for encoding and decoding images, according to one embodiment of the present disclosure. As shown, the computing environment 100 includes two computer systems 110A and 110B connected through a network 130. In one embodiment, the computer system 110 is a conventional computer system executing, for example, a Microsoft Windows-compatible operating system (OS), Apple OS X, and/or a Linux distribution. In another embodiment, the computer system 110 can be a device having computer functionality, such as a personal digital assistant (PDA), mobile telephone, video game system, etc.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

The network 130 enables communications between the computer systems 110. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The computer system 110A encodes 150 an original image 115 to generate an encoded image 120A. The original image can be, for example, a still image or an image contained in a frame of video. The encoding 150 compresses the original image 115 to produce an encoded, or "compressed," image 120A that represents the original image using less information (e.g., fewer bits) compared to the original image 115. The encoded image 120A thus provides for efficient storage of the information in the original image 115.

The encoded image 120A also allows for efficient transmission 155 of the information in the original image 115 over the network 130. For example, the encoded image 120A can be transmitted 155 by the computer system 110A over the network 130 and received 160 by computer system 110B. The encoded image 120B received by computer system 110B represents the copy of encoded image 120A held by computer system 110A. The computer system 110B can decode 165 the encoded image 120B to obtain a replica 125 of the original image or an approximation of the original image, the "decompressed" image. This transmission scenario can occur, for example, when a user is using computer system 110B to browse the web and download images from web sites. The images can be still images, frames of video arranged in a sequence and stored in a discrete file, and/or frames of video streamed to computer system 110B. The encoding/decoding techniques described herein can also be used in non-networked environments.

In one embodiment, the encoding process 150 used by computer system 110A uses a block-based technique. In this technique, the image is divided into a set of blocks, such as blocks of 16×16 pixels. The blocks are encoded in a specified sequence, such as a scan-line order from left-to-right, top-to-bottom. A block in the sequence to be encoded, called a "target block," is encoded by describing the differences between the target block and another block in the image, called the "reference block." Said another way, the reference block is used to "predict" the target block, and the result of this prediction is encoded.

The quality of the encoding (i.e., amount of compression) is determined in part by the amount of information required to predict the target block from the reference block and the amount of information required to identify the reference block. An embodiment of the encoding process 150 provides a set of candidate blocks from which to select the reference block, and also provides an efficient way to identify the selected block. Heuristics are used for identifying the set of candidate source blocks, for example, source blocks are selected from within a cluster of similar blocks obtained by k-means clustering of blocks. For a target block, a region adjacent to the target block is identified and a set of candidate source blocks along with candidate source regions adjacent to the candidate source blocks are identified. The candidate source regions are ranked based on the differences between the candidate source regions and the information from the target block and the region surrounding the target block that is available at the decoder. Each candidate source block is described using its rank and residual information describing differences between the candidate source block and the target block. The candidate source block that can be described using a minimum amount of information and total distortion is selected as the reference block that predicts the target block.

The residual information and the position of the reference block in a sequence of candidate source blocks is stored in the compressed image.

The corresponding decoding process 165 decodes the encoded image 120B block-by-block. Blocks of the image 125 that have been decoded may be used to decode subsequent blocks. Aspects of the image using during encoding, such as the ranks of the candidate source regions are reconstructed during decoding and used to produce the replica 125 of the original image 115.

Computer Architecture

Figure 2:
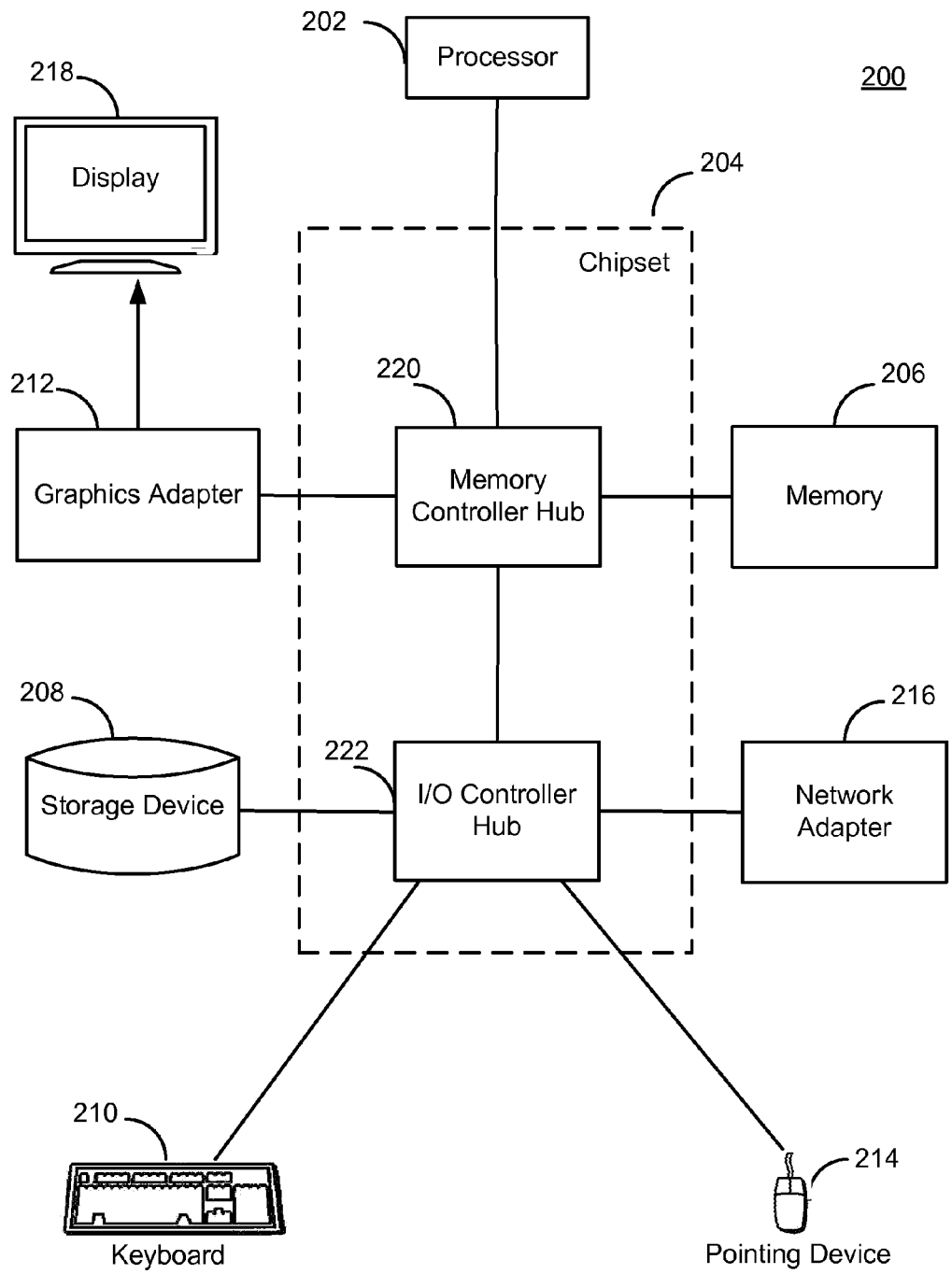
FIG. 2 is a high-level block diagram illustrating an example of a computer for use in the computing environment shown in FIG. 1 according to one embodiment of the present disclosure.

FIG. 2 is a high-level block diagram illustrating an example computer 200, such as a computer system 110 shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used as the computer systems 110 of FIG. 1 can vary depending upon the embodiment and requirements. For example, the computer system 110A used for encoding might include one or more blade computers lacking displays, keyboards, and/or other devices shown in FIG. 2. Likewise, the computer system 110B used for decoding might comprise a mobile phone or other such device with a touch-sensitive display and limited processing power.

Example Architectural Overview

Figure 3:
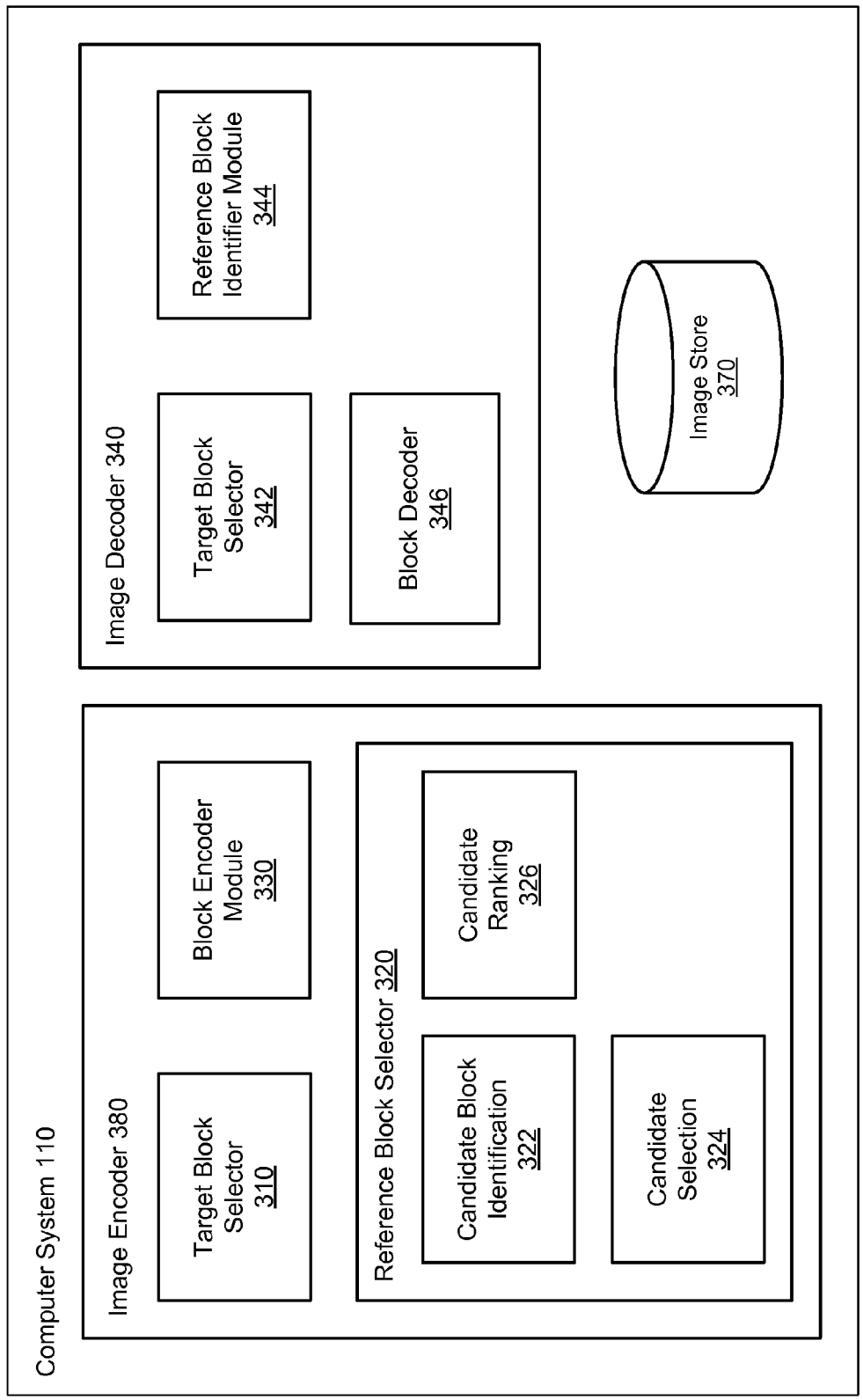
FIG. 3 is a high-level block diagram illustrating a detailed view of modules within a computer system for encoding and/or decoding an image according to one embodiment.

FIG. 3 is a high-level block diagram illustrating a detailed view of modules within a computer system 110 for encoding and/or decoding an image according to one embodiment. Some embodiments of the computer system 110 have different and/or other modules than the ones described herein, and the functions can be distributed among the modules in a different manner than is described here. For example, while FIG. 3 shows the computer system 110 including modules for both encoding and decoding, in some embodiments a computer system might only contain modules for only encoding or only decoding.

The computer system 110 includes an image store 370, an image encoder module 380, and an image decoder module 340. The image store 370 stores data and metadata associated with images being processed. This data can include the original image 115, an encoded or decoded version of the original image 125, and data used during the encoding/decoding processes. As mentioned above, the original image can be, for example, a still image or an image from a video having a sequence of images. An image in the source includes a set of pixels, and each pixel has one or more component intensities.

The image encoder module 380 operates to encode, i.e., compress, an original image from the data store 370 to produce an encoded, i.e., compressed, image. The original image can be specified by user-input or through an automated process. In one embodiment, the functions of the image encoder module 380 are provided by a number of additional modules, as illustrated in FIG. 3.

A target block selector module 310 within the image encoder module 380 selects blocks of the original image to be encoded. In an embodiment, the target block selector module 310 divides the original image into a set of blocks (e.g., 16-pixel by 16-pixel blocks) and selects blocks for encoding in a scan-line order that enumerates the blocks starting from the top-left corner of the image and proceeds from left to right and top to bottom. The scan-line order can track the entire width of the image horizontally from left to right before moving down by one block or it can track the entire height of the image vertically from top to bottom before moving right by one block. Other embodiments can increment in both horizontal and vertical directions before completing the entire width or height of the image. Alternatively, the scan-line order can proceed from any corner of the image other than the top-left corner.

Figure 8A:
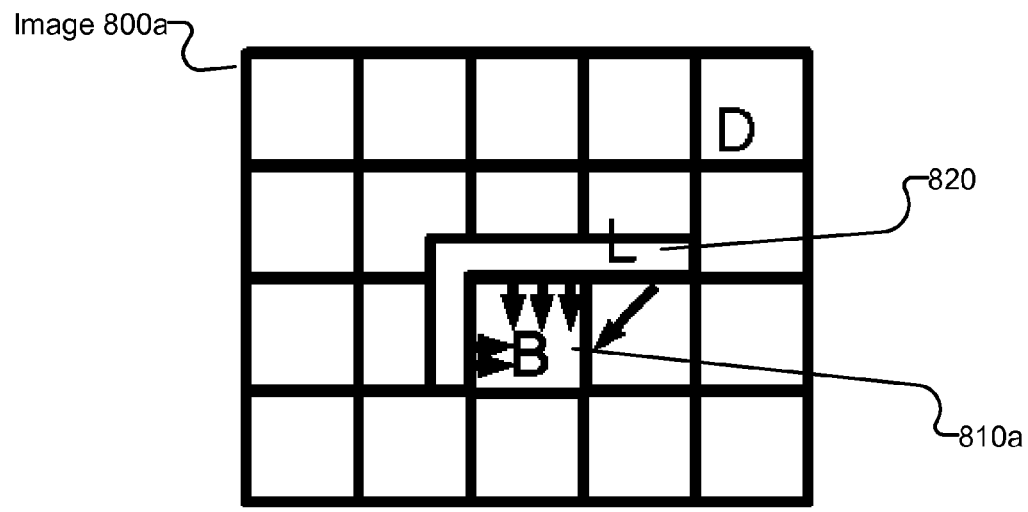
FIG. 8*a* illustrates an image decomposed into blocks showing an L-shaped region to predict a target block according to one embodiment of the present disclosure.
Figure 8B:
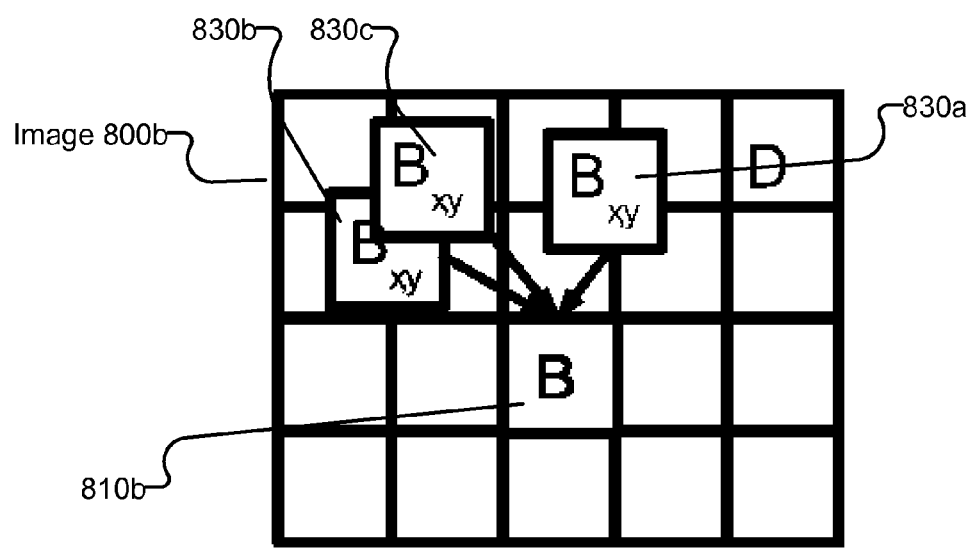
FIG. 8*b* illustrates an image decomposed into blocks and candidate source blocks for predicting a target block according to one embodiment of the present disclosure.

A reference block selector module 320 selects reference blocks to be used to encode the selected target blocks. For a selected target block, the reference block selector module 320 identifies a set of candidate source blocks. FIG. 8b illustrates candidate source blocks 830 for predicting target block 810b in image 800b. Each candidate source block is selected from a region of the original image that will have already been decoded when the target block is decoded. The reference block selector module 320 compares the candidate source blocks and the blocks' adjacent regions to the target block and that block's adjacent region. The reference block selector module 320 uses this comparison to select a candidate source block that can be described using a minimum amount of information as the reference block.

To this end, a candidate block identification module 322 identifies a set of candidate source blocks available for a given target block. In general, the candidate source blocks can be drawn from the blocks in the original image that occur and are encoded prior to the target block in the scan-line order because these blocks are available for predicting the target block during decompression. Using a small number of candidate source blocks renders the encoding process computationally more efficient since fewer blocks are processed. Therefore, one embodiment of the candidate block identification module 322 draws the candidate source block from a subset of the image processed in the scan-line order rather than the entire region that has been encoded.

In one embodiment, the candidate block identification module 322 determines clusters of blocks based on similarity of features of the blocks, for example, the textures of the blocks. The candidate block identification module 322 treats the blocks as feature vectors describing the blocks in a high-dimensional space. The candidate block identification module 322 divides the blocks into similar clusters by using, for example, a hierarchical k-means tree. The candidate block identification module 322 divides the blocks' feature vectors into k sets at each level using k-means clustering. The k sets of blocks at each level are further sub-divided into k more sets and so on recursively. All blocks assigned to a leaf node in the k-means tree are classified as part of a single cluster of blocks.

A cluster of blocks can be considered a texture model representing the blocks within the cluster. The cluster of blocks to which the target block belongs is used by the candidate block identification module 322 as the set of candidate source blocks for encoding the target block. This process, which is completed once per image, provides a cluster map across each image which is separately communicated to the decoder. In another embodiment, no clustering is done and instead candidate blocks are identified from the full set that is available to the decoder, based on spatial proximity and boundary pixel similarity to (or pixel difference with) the target block. This second embodiment does not require separate communication of a cluster map but, at the same time, must base its decoder-known selection process on less target block information.

A candidate selection module 324 selects a candidate source block as a reference block for the target block. The candidate selection module 324 selects the reference block from the candidate source blocks based on optimization of certain cost criteria associated with the candidate source blocks, for example, based on minimization of the cost metric. In an embodiment, the cost criteria associated with the candidate source blocks is the L1 norm or the L2 norm of the feature vector of the residual (i.e., difference in pixel intensities) between the source block and the target block, wherein the residual information indicates how well the source block predicts the target block. The L1 norm of a vector corresponds to the sum of the magnitudes of the various components of the vector. The L2 norm of a vector is the sum of the squares of the components of the vector. The feature vector of the residual is computed by taking the difference between the feature vector of the source block and the target block. The target-block prediction may be encoded using a frequency domain representation of the image that separates the prediction information for various frequency components available in the image. In one embodiment, the prediction for the low-frequency components can be completed by extrapolation from previously transmitted neighbor blocks while the mid-frequency and high-frequency components are handled using the candidate selection process described above, using frequency-filtered versions of those predictors.

The reference block that is selected by the encoder is selected according to a combination of the final distortion within the target block obtained by prediction based on the reference block, a selected quantization parameter, and the number of bits required to communicate the reference-block selection and the quantized residual to the decoder. For example, a reference block $B_1$ that minimizes the L2 norm of the residual has large high-frequency components and needs more bits to encode compared to another reference block $B_2$ with higher L2 norm of its residual. As a result, a reference block that minimizes the L2 norm (in this example, block $B_1$) may not be the reference block that minimizes the amount of information used to represent the target block. Therefore, one embodiment minimizes a cost metric $C_a$ associated with the reference block $B_i$ based on the following equation:

(1)

In the equation (1), $R_i$ represents the residual of the reference block compared to the original target block $B_i$, $\lambda_1$ represents a hyperparameter that has constant value, $\| \ldots \|$ represents a scalar value of an input feature vector, for example, the L2 norm of a given feature vector, $BITS(R_i)$ represents the size of residual information as measured by the number of bits used for representing the residual, and $\hat{R}_i$ represents a quantized and reconstructed version of $R_i$. The computation of the reconstructed residual $\hat{R}_i$ for each candidate source block comprises various operations including the discrete cosine transform (DCT), quantization, dequantization, and inverse DCT of $R_i$. An example value of the hyperparameter $\lambda_1$ is 0.6.

Figure 9:
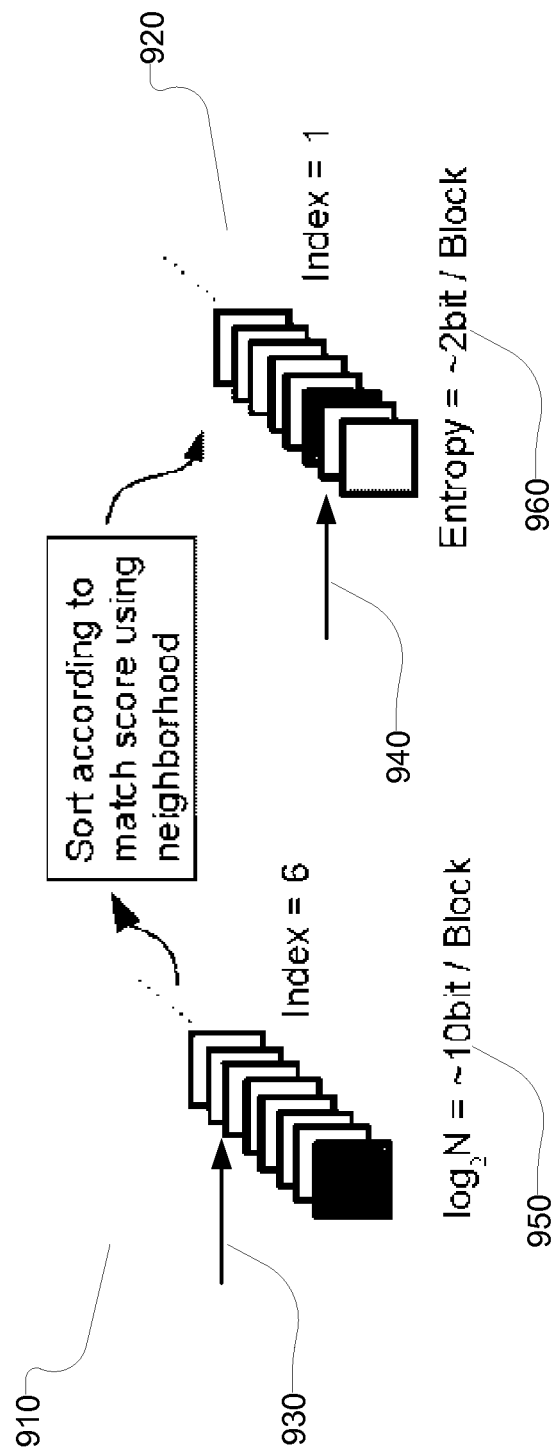
FIG. 9 illustrates specifying the position of a reference block in a list of candidate source blocks according to one embodiment of the present disclosure.

The information encoded for each target block includes the information identifying that target block's reference block. The number of bits used for encoding each block can be reduced by utilizing efficient mechanisms for identifying the reference blocks. The reference block can be identified by specifying (x, y) coordinates associated with the block. However, a large number of bits may be required to identify the reference block based on (x, y) coordinates. Therefore, an embodiment of the image encoder module 380 uses a candidate ranking module 326 to rank the candidate source blocks in an order. Once the candidate source blocks are ranked, the image encoder module 380 can identify the reference block by its position in the ranked order, rather than using (x, y) coordinates or other less efficient techniques. If the number of candidate source blocks is N, the number of bits required to represent the position of an arbitrary block in a sequence of N blocks is $\log_2 N$. If the number of candidate source blocks N is of the order of several thousands, the value of $\log_2 N$ can be as high as 10 bits to represent a block. FIG. 9 illustrates how the position 930 of a block can be used to identify a reference block within a sequence 910 of blocks. In one embodiment, the position of a block in a sequence of blocks is called an index.

One embodiment of the candidate ranking module 326 ranks the candidate source blocks using a criteria that result in the reference block occurring close to the beginning of the ranking. As a result, the position of the reference block in the ranking can be represented using a number significantly smaller than N that requires fewer than $\log_2 N$ bits to represent. One such embodiment is based on ordering the candidate source blocks using an L-score value associated with the blocks as described below. FIG. 9 illustrates how the index 940 of a reference block can be used to identify a block within a sequence 920 of blocks that is sorted based on L-score values. As shown in FIG. 9, the number of bits 960 required to identify the reference block in a sequence 920 of blocks that is sorted by their L-scores is less than the number of bits 950 required in an unsorted list 910.

To rank the candidate source blocks, the candidate ranking module 326 computes an L-score value associated with each candidate block for ranking the candidate source blocks. A block is associated with an L-shaped region that is adjacent to the block and is part of the decoded region of the image. FIG. 8a illustrates the L-shaped region 820 associated with the block 810 in the image 800a. For example, if the scan-line order followed by the encoding 150 starts horizontally from the top-left corner of the image, the L-shaped region associated with the blocks corresponds to pixels adjacent to the left edge and the top edge of the block. The L shaped region on the top of the block can extend to the right edge of the image since that portion of the image is already decoded. The L-score between two blocks is the distance between the two L-shaped regions associated with the two blocks. The distance between the two L-shaped regions is a predictor for the difference between the blocks associated with the two L-shaped regions. For example, the difference between the two regions may be measured using the feature vectors corresponding to the two L-shaped regions. The distance between the two L-shaped regions can also be measured using the squared pixel differences between the two regions. In one embodiment, the L-shaped region is one-pixel wide and the difference between two L-shaped regions is measured based on pixel intensity difference between the regions. In other embodiments, the L-shaped region is few pixel wide and the difference between two L-shaped regions is measured based on higher-order descriptors, for example, gradient or gist. The quality of a candidate source block based on the image difference between the target block and the source block is positively correlated with the L-score of the reference block.

The candidate ranking module 326 ranks the candidate source blocks by their L-scores, thus allowing the image encoder module 380 to identify the reference block by the block's index in the ranked list. The index of a ranked reference block is typically observed to be much smaller than an index into an unordered list of candidate source blocks. For example, in a list of 1024 candidate source blocks ranked by their L-score, the average index of a reference block can often be represented using two bits. In alternative embodiments, the L-score can be determined based on other shapes of regions associated with the blocks and the regions may or may not be adjacent to the block.

In one embodiment, the candidate selection module 324 uses the ranking of the candidate source blocks provided by the candidate ranking module 326 to select the reference block. The use of the ranking of the candidate source blocks allows the candidate selection module 324 to minimize the total amount of information required for representing the reference block including the residual information and the information identifying the reference block. Accordingly, the candidate selection module 324 selects the reference block $B_i$ based on cost metric $C_b$ based on the following equation.

$$C_b(B_i) = \text{BITS}(R_i) + \lambda_1 \|\hat{R}_i - R_i\| + \lambda_2 * \log_2(i+1) \qquad (2)$$

In the equation (2), $\lambda_2$ represents a hyperparameter that has a constant value, i represents the index of the reference block in the set of candidate source blocks, and the remaining variables and constants are the same as equation (1). An example value of $\lambda_2$ is one (approximating the variable portion of the bits needed by continuation codes). According to equation (2), given two candidate source blocks $B_1$ and $B_2$ with similar values of cost metric $C_b(B_1)$ and $Cb(B_2)$, the block that requires fewer bits to represent its index in the candidate source list has a higher chance of being selected as a reference block. Since the number of bits used to identify the reference block can occupy a significant portion of the information used for encoding an image, the cost criteria in equation (2) provides reduced size of the encoded image compared to the criteria based on equation (1). The cost metrics given by equation (1) and (2) allow the candidate source blocks to be ranked and the reference block to be selected based on size of residual information indicating how well the reference block predicts the target block and a size of information used to specify the position A block encoder module 330 encodes target blocks using the respective reference blocks. For a given target block, the block encoder module 330 computes residual information that corresponds to the differential of information between the reference block and the target block. The block encoder module 330 encodes the target block based on information identifying the reference block (i.e., the ranking) from the candidate source blocks and the residual information.

The encoded blocks produced by the block encoder module 330 are stored as the encoded image 120A. The encoded image 120A thus includes, for a given target block, an identifier of the reference block for that target block (i.e., the index) and the residual information resulting from using the reference block to predict the target block.

The image decoder module 340 decodes the encoded image 120A to produce the replica 125 of the original image 115. In general, the decoding process is the inverse of the encoding process except that the reference block is specified. The decoding process can be initiated in response to user input or as part of an automated process.

A target block selector module 342 within the image decoder 340 decodes blocks of the image in the same order in which the blocks were encoded. This order ensures that the reference block corresponding to each target block is available in the region of the image already decoded. A reference block identifier module 344 uses the information identifying a reference block for the target block to identify the corresponding reference block from the decoded region of the image, by, e.g., ranking the candidate source blocks and using the specified reference block identifier the position in the ranked list. A block decoder module 346 combines the reference block with the residual information for the target block to determine the information in the target block. The decoded target blocks collectively form the replica of the original image or an approximation of the original image.

In one embodiment, since there is no previously decoded block for the first block in the decoding process, there is no reference block available to decode the first block. Instead, the block encoder module 330 may provide alternative information to decode the first target block. For example, the block encoder module 330 may provide the pixels of the first target block. In an embodiment, the block encoder module 330 may provide the pixels of the first few target blocks of the encoded image since the set of candidate source blocks is small for these blocks and a suitable reference block may not be available for a target block in the small set of candidate source blocks.

Figure 4:
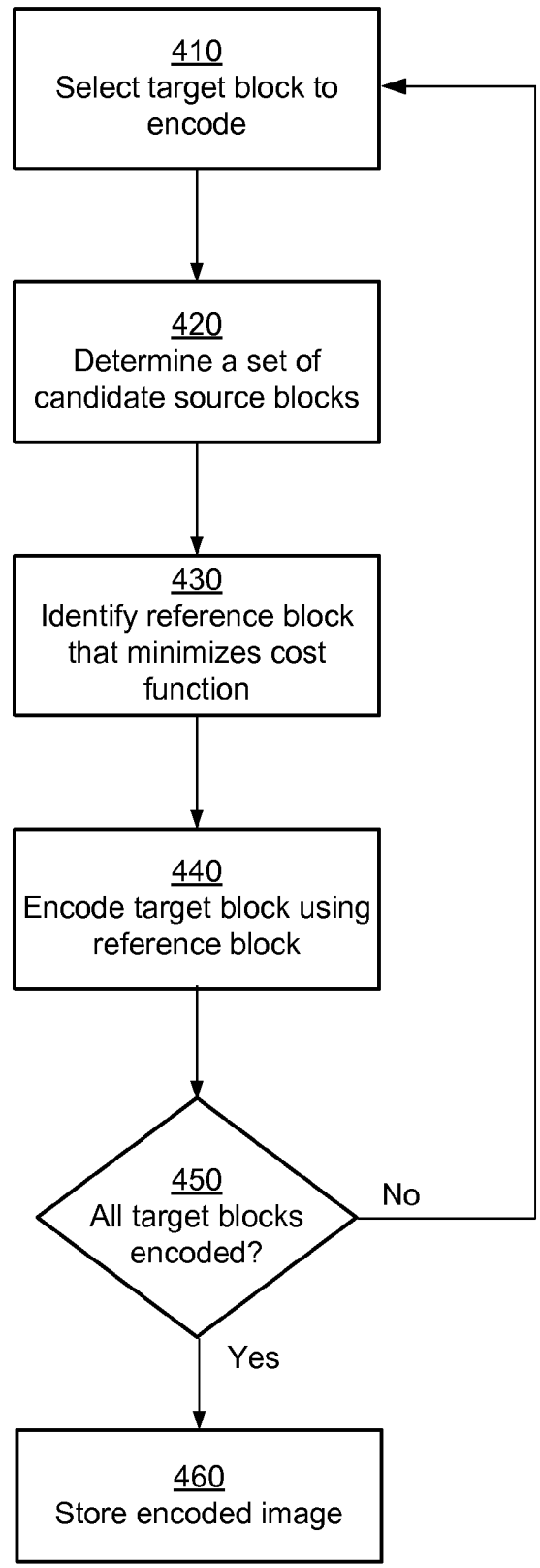
FIG. 4 is a flow diagram illustrating a process for encoding an image according to one embodiment of the present disclosure.

FIG. 4 is a flowchart illustrating steps performed by an embodiment of the image encoder module 380 for encoding an image. Other embodiments can perform different and/or additional steps. Moreover, other embodiments can perform the steps in different orders. Further, the steps can be performed by entities other than the module specified in the description of FIG. 4.

The image encoder module 380 selects 410 a target block to encode. The image encoder module 380 may select 410 the next block to encode based on a scan-line order of traversal of the blocks of the image as described above. The image encoder module 380 determines 420 a set of candidate source blocks for encoding the selected target block. In an embodiment, the image encoder module 380 uses k-means clustering to obtain clusters of blocks representing texture models within the image. The clusters of the blocks are used by the image encoder module 380 to determine 420 the sets of candidate source blocks. The set of candidate source blocks is determined as a subset of blocks available for predicting the target block during decoding of the compressed image. The subset is calculated as the overlap (or intersection) of the blocks available to the decoder with a cluster of blocks determined by clustering blocks of the image based on similarity of features of the blocks.

The image encoder module 380 identifies 430 a reference block within the candidate source blocks based on criteria that minimizes cost functions, for example, cost functions based on equations (1) or (2). In one embodiment, the image encoder module 380 ranks the candidate source blocks based on their L-scores and uses the index of the reference block in the ordered list to identify the reference block. The image encoder module 380 encodes 440 each target block using information comprising the identification of the corresponding reference block and residual information representing the image difference between the reference block and the target block. The image encoder module 380 checks 450 if there are more blocks to be encoded. The above steps of encoding are continued until all target blocks are encoded.

The image encoder module 380 stores 460 the encoded image in the image store 370. In an embodiment, the target blocks of the image may be stored 460 before the processing of the next target block begins. The encoded image or the target blocks of the image may be transmitted to another computer system 110 over a network 130.

Figure 5:
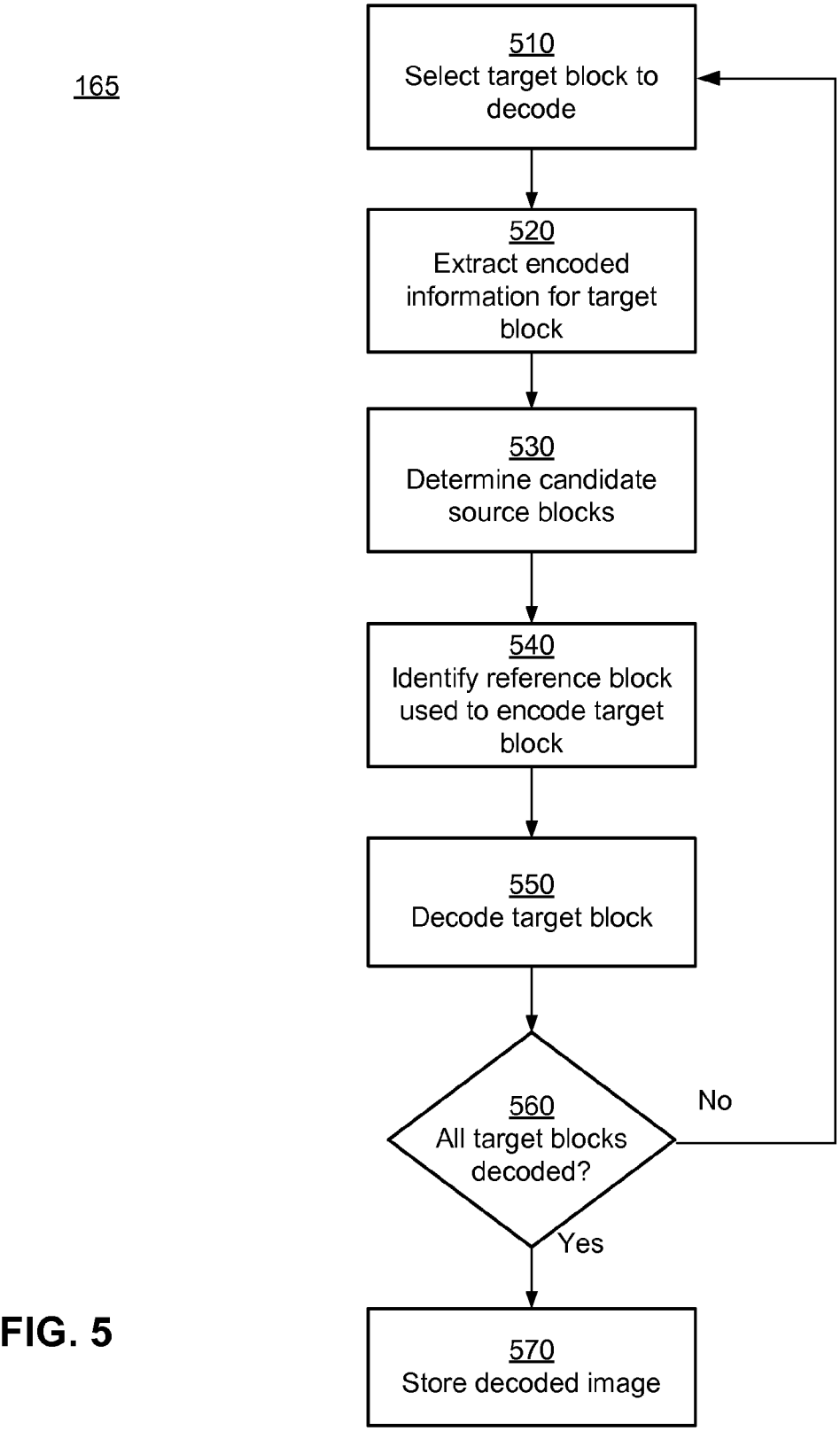
FIG. 5 is a flow diagram illustrating a process for decoding an image according to one embodiment of the present disclosure.

FIG. 5 is a flowchart illustrating steps performed by an embodiment of the image decoder module 340 for decoding an image encoded by the image encoder module 380. Other embodiments can perform different and/or additional steps. Moreover, other embodiments can perform the steps in different orders. Further, some or all of the steps can be performed by entities other than the image decoder module 340.

The image decoder module 340 selects 510 the next target block to decode. The image decoder module 340 extracts 520 the information for the target block from within the encoded image. The extracted information comprises information identifying a reference block used for encoding the target block and residual information between the reference block and the encoded target block.

The image decoder module 340 determines 530 the list of candidate source blocks for identifying the reference block. The image decoder module 340 identifies 540 the reference block within the candidate source blocks. For example, the information identifying the reference block may be a rank within a ranked list of candidate source blocks based on their L-scores. The image decoder module 340 computes the L-scores of the candidate source blocks to rank them and uses the index in the list provided by the encoded block to identify 540 the reference block.

The image decoder module 340 decodes 550 the block based on the reference block and the residual information available in the encoded target block. The image decoder module 340 checks 560 if all target blocks are decoded and continues decoding the remaining target blocks. The decoded image is stored 570 in the image store 370. In an embodiment, the decoded blocks may be stored 570 in the image store 370 while subsequent blocks are being decoded.

Figure 6:
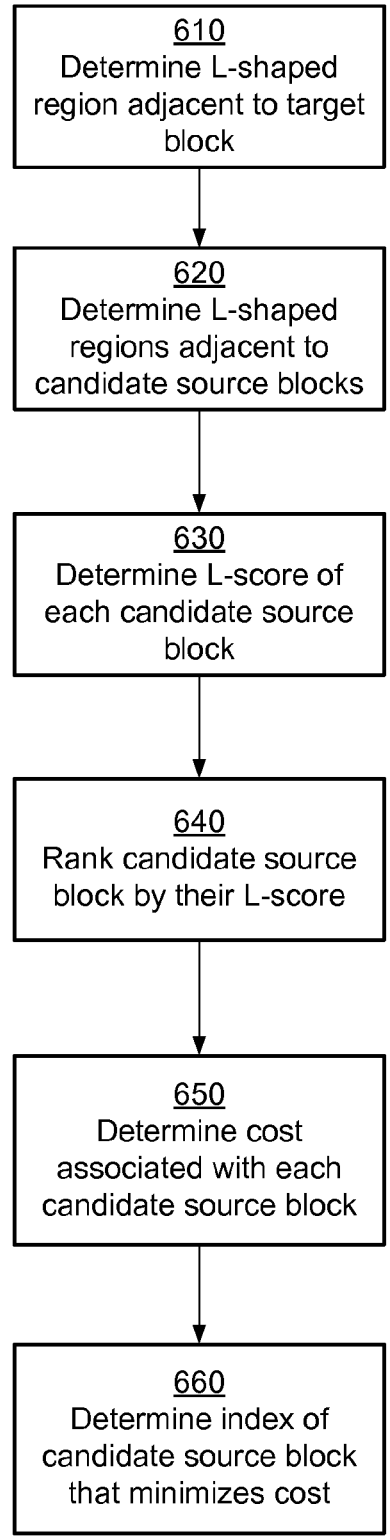
FIG. 6 is a flow diagram illustrating a process for identifying a reference block for encoding a target block according to one embodiment of the present disclosure.

FIG. 6 is a flow diagram illustrating a process for identifying 430 a reference block for encoding a target block performed by an embodiment of the reference block selector module 320. Other embodiments can perform different and/or additional steps. Moreover, other embodiments can perform the steps in different orders. Further, some or all of the steps can be performed by entities other than the reference block selector module 320.

The reference block selector module 320 determines 610 an L-shaped region adjacent to the target block. The reference block selector module 320 further determines 620 the L-shaped regions adjacent to each candidate source block. In alternative embodiments, the regions determined may be shaped differently than an L-shape and may not be adjacent to the corresponding target or candidate source block. The reference block selector module 320 compares the L-shaped region of each candidate source block and the L-shaped region of the target block to determine 630 the L-score of each candidate source block. The L-score of a candidate source block measures the difference between the candidate source block and the target block based on feature vector differences, pixel differences or other criteria. The reference block selector module 320 ranks 640 the candidate source blocks based on their L-scores and identifies the reference block by its position in the ranked order.

The reference block selector module 320 determines 650 the cost associated with each candidate source block based on a predetermined criteria, for example, the cost metric defined in equation (1) or (2). The cost metric for each candidate source block attempts to maximize the quality of block that is reconstructed while minimizing the number of bits required to encode the block. The reference block selector module 320 determines 620 the candidate source block that minimizes the cost as the reference block for encoding the target block. The reference block selector module 320 determines the position of the reference block in the ordered list of candidate and uses the index to identify 530 the reference block within the candidate source blocks.

Figure 7:
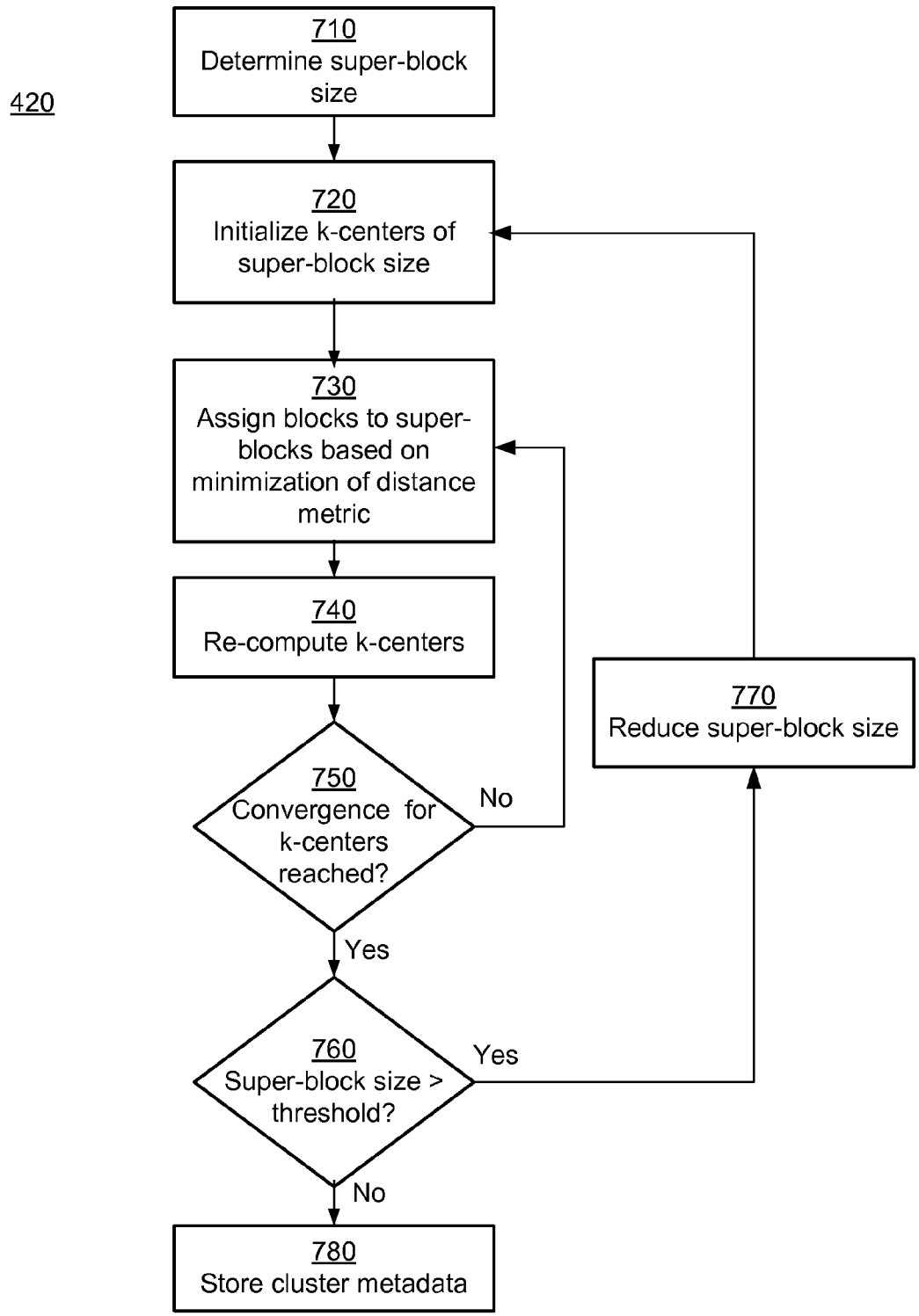
FIG. 7 is a flow diagram illustrating a process for clustering based on k-means clustering for determining a set of candidate source blocks according to one embodiment of the present disclosure.

FIG. 7 is a flow diagram illustrating a process for clustering based on k-means clustering for determining 420 a set of candidate source blocks, performed by an embodiment of the candidate block identification module 322. Other embodiments can perform different and/or additional steps. Moreover, other embodiments can perform the steps in different orders. Further, some or all of the steps can be performed by entities other than the candidate block identification module 322.

The process illustrated in FIG. 7 recursively performs a hierarchical clustering of image blocks to be used as reference blocks. Each block is assigned to one of k k-centers, where each k-center is a super-block, which is a block of size larger than the blocks being clustered. The super-block size for each k-center is determined 710 at the beginning of the hierarchical clustering procedure. For example, if the blocks being clustered are 16×16 pixels, then a super-block size of 64×64 may be chosen. The k-centers of the super-block size are initialized 720 based on any k-means cluster initialization technique. Each k-center is assumed to be associated with a super-block of super-block size. Each block is assigned 730 to one of the k super-blocks by associating the block with an index and an offset (x,y location within the super-block). A block is assigned 730 to the super-block center that minimizes a measure of distance between the block and the blocks assigned to the super-block. For example, the distance between blocks may be measured using either the L1 norm or the L2 norm of the feature vectors of the blocks. Alternatively, the distance between two blocks may be computed using the frequency components obtained by computing a DCT of the blocks. In one embodiment, the distance metric based on frequency components weights the mid-range frequency higher than the low and high-range frequency. In one embodiment, a penalty is imposed on the assignment of blocks that favors complete super-blocks, wherein a complete super-block is defined as a super-block that overlaps with at least one assigned block at each pixel location with the super-block. Once all the blocks are assigned to the k-centers, the positions of the k-centers are recomputed 740 based on an aggregate value computed from the blocks assigned to the corresponding cluster. The blocks within the super-block are assigned 730 again to the recomputed k-centers, the k-centers recomputed 740, and the process continued until a convergence for k-centers is reached 750. For example, the convergence of the k-centers may be considered reached if the movement of the k-centers each time they are re-computed 740 is within a threshold distance.

In one embodiment, the hierarchical clustering is performed in multiple stages, where each stage employs a different super-block size. For example, the initial super-block size may be as large as the image itself, followed by recursively diminishing the block size at each stage until a fixed multiple of the reference block size is reached. The candidate block identification module 322 checks 760 if the super-blocks are bigger than a threshold size. If the super-blocks are larger than the threshold value the super-block size is reduced 770 and the above process repeated. The clusters computed at one stage, i.e. super-block centers and the blocks assigned to them, serve as an initialization 720 for the next stage. In one embodiment, the initialization is performed by sub-dividing the previous super-block centers into smaller super-blocks and using them as the initial super-block centers for the next stage. If all blocks reach the expected size for encoding the image, the recursive decomposition process is stopped and the cluster metadata are stored 780 in the image store 370. The leaf-nodes of the k-means tree are identified as the clusters of the blocks of the image. In an embodiment, the cluster metadata may be stored in the image store 370 while the process of decomposing super-blocks continues.

Typically in images, overlapping blocks may have similar appearance but may differ only by a translational shift from each other. Accordingly a cluster may be represented by an image region (corresponding to a super-block) that is larger than the blocks used for encoding/decoding. Each super-block corresponding to a cluster can be represented using a cluster-id and individual blocks within the cluster represented using a cluster-id for the super-block and an offset within the super-block. In this embodiment, the k-centers of the k-means clustering are associated with super-blocks of size greater than the blocks used for encoding/decoding. The assignment of blocks to k-centers is performed by finding the best matching offset (or translation) within each super-block for that block and selecting the k-center and offset combination that provides the best match among all centers.

The criteria for finding the best matching offset within each super-block includes a measure of similarity of texture of the block to the other blocks assigned to the super-block. In some embodiments, the criteria for assigning blocks to super-blocks incorporates factors that result in a uniform block assignment across all super-blocks and minimizing unoccupied area in each super-block. Each potential block assignment is weighted by the amount of unoccupied area of a super-block that the new block can occupy. A penalty is imposed for a block assignment that results in a block occupying a super-block that is completely occupied by blocks or a block assignment that results in the new block occupying portions that are already occupied by other blocks. As a result over-crowding of blocks to a single super-block is discouraged and blocks are uniformly spread across super-blocks.

As mentioned above, the processes described herein can be used to encode still images as well as videos. In case of videos, the candidate sets of source blocks for a frame of the video can be selected from previous frames of the video. In an embodiment, the clustering of blocks can be performed over a set of example images or videos. The resulting clusters based on the texture models are pre-computed and made available as a dictionary of blocks to the decoder prior to the decoding of the image. The image encoder module 380 can encode target blocks based on reference blocks selected from the dictionary of blocks. Each reference block may be represented using an identifier of a super-block representing a cluster that the reference block belongs to and an offset within the cluster. Alternatively, the reference block may be represented using an integer index representing the position of the reference block in the dictionary.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compression and decompression of images and videos based on block prediction. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method performed by a computer for compressing a digital image, the method comprising:
   identifying, in the image, a target block to be encoded;
   identifying, in the image, candidate source blocks for predicting the target block;
   ranking the candidate source blocks in an order;
   selecting a reference block from among the candidate source blocks, the reference block identified by a position in the ranked order and selected responsive to a size of residual information indicating how well the reference block predicts the target block and a size of information used to specify the position;
encoding the target block using the reference block; and
storing a compressed image having the encoded target block.

2. The method of claim 1, wherein identifying the candidate source blocks for predicting the target block comprises:
identifying available blocks in the image, the available blocks available for predicting the target block during decoding of the compressed image;
determining a subset of available blocks that overlaps with a cluster of blocks, wherein the cluster is determined by clustering blocks of the image based on similarity of features of the blocks and the cluster includes the target block and one or more of the available blocks; and
establishing the one or more available blocks in the cluster as the candidate source blocks.

3. The method of claim 2, wherein determining the cluster comprises:
performing hierarchical k-means clustering based on features of the blocks of the image into k sets at each level of a hierarchical k-means tree;
identifying a leaf-node of the hierarchical k-means tree containing the target block and one or more of the available blocks; and
establishing the leaf-node as the cluster including the target block and one or more of the available blocks.

4. The method of claim 1, wherein ranking the candidate source blocks in an order comprises:
identifying a target region adjacent to the target block;
identifying a plurality of candidate source regions, each candidate source region adjacent to a candidate source block;
determining differences between the candidate source regions and the target region; and
ranking the candidate source blocks in an order determined responsive to the determined differences between the candidate source regions and the target region.

5. The method of claim 4, wherein determining differences between the candidate source regions and the target region comprises:
for each candidate source region, determining a pixel difference between the candidate source region and the target region.

6. The method of claim 1, wherein selecting the reference block from among the candidate source blocks comprises:
for a candidate source block, determining residual information indicating how well the candidate source block predicts the target block;
computing a feature vector of the residual information;
computing the L1 or L2 norm for the feature vector; and
determining whether to select the candidate source block responsive to a cost metric that determines a cost of the candidate source block using a size of the residual information indicating how well the candidate source block predicts the target block and the L1 or L2 norm of the feature vector.

7. The method of claim 6, wherein cost metrics are determined for the candidate source blocks and wherein the candidate source block is selected responsive to having a minimum cost metric of the cost metrics.

8. The method of claim 1, wherein the reference block is selected from among the candidate source blocks responsive to a cost metric indicating a size of information used to represent the residual information and the position, and wherein the cost metric for the selected candidate source block is lower than cost metrics of other candidate source blocks.

9. The method of claim 1, wherein encoding the target block comprises:
computing residual information between the reference block and the target block; and
storing the residual information and the position in the compressed image.

10. A method performed by a computer system for decoding a compressed digital image, the method comprising:
identifying, in the image, a target block to be decoded;
identifying, in the image, a set of candidate source blocks for predicting the target block;
ranking the candidate source blocks in an order;
retrieving, from the image, a position of a candidate source block in the ranked order, wherein the candidate source block is a reference block, and wherein the reference block was selected during compression of the digital image responsive to a size of residual information indicating how well the reference block predicts the target block and a size of information used to specify the position;
decoding the target block using the reference block; and
storing an uncompressed image having the decoded target block.

11. The method of claim 10, wherein identifying the set of candidate source blocks for predicting the target block comprises:
identifying a cluster of blocks for decoding the target block, wherein the cluster is determined during encoding of the image based on similarity of features of the blocks of the image; and
identifying a set of decoded blocks that belong to the identified cluster as the set of candidate source blocks.

12. The method of claim 11, wherein determining the cluster during encoding of the image comprises:
performing hierarchical k-means clustering based on features of the decoded blocks to divide the blocks of the image into k sets at each level of a hierarchical k-means tree;
identifying a leaf-node of the hierarchical k-means tree; and
establishing leaf-nodes of the hierarchical k-means tree as clusters.

13. The method of claim 10, wherein ranking the candidate source blocks in an order comprises:
identifying a target region adjacent to the target block;
identifying a plurality of candidate source regions, each source region adjacent to a candidate source block;
determining differences between the candidate source regions and the target region; and
ranking the candidate source blocks in an order determined responsive to the determined differences between the candidate source regions and the target region.

14. The method of claim 13, wherein determining differences between the candidate source regions and the target region comprises:
for each candidate source region, determining a pixel difference between the candidate source region and the target region.

15. The method of claim 10, wherein decoding the target block comprises combining the reference block with the residual information.

16. A computer-implemented system for compressing a digital image, the system comprising:
a computer processor; and a non-transitory computer-readable storage medium storing computer program modules configured to execute on the computer processor, the computer program modules comprising:
- a target block selector module configured to:
  - identify, in an image, a target block to be encoded;
- a reference block selector module configured to:
  - identify, in the image, candidate source blocks for predicting the target block;
  - rank the candidate source blocks in an order;
  - select a reference block from among the candidate source blocks, the reference block identified by a position in the ranked order and selected responsive to a size of residual information indicating how well the reference block predicts the target block and a size of information used to specify the position;
- a block encoder module configured to:
  - encode the target block using the reference block; and
  - store a compressed image having the encoded target block.

17. The computer-implemented system of claim 16, wherein the reference block is selected from among the candidate source blocks responsive to a cost metric indicating a size of information used to represent the residual information and the position, and wherein the cost metric for the selected candidate source block is lower than cost metrics of other candidate source blocks.

18. The computer-implemented system of claim 16, wherein encoding the target block comprises:
- computing residual information between the reference block and the target block; and
- storing the residual information and the position in the compressed image.

19. A computer program product having a non-transitory computer-readable storage medium storing computer-executable code for compressing a digital image, the code comprising:
- a target block selector module configured to:
  - identify, in an image, a target block to be encoded;
- a reference block selector module configured to:
  - identify, in the image, candidate source blocks for predicting the target block;
  - rank the candidate source blocks in an order;
  - select a reference block from among the candidate source blocks, the reference block identified by a position in the ranked order and selected responsive to a size of residual information indicating how well the reference block predicts the target block and a size of information used to specify the position;
- a block encoder module configured to:
  - encode the target block using the reference block; and
  - store a compressed image having the encoded target block.

20. The computer program product of claim 19, wherein the reference block is selected from among the candidate source blocks responsive to a cost metric indicating a size of information used to represent the residual information and the position, and wherein the cost metric for the selected candidate source block is lower than cost metrics of other candidate source blocks.

* * * * *